(12) United States Patent
Audebert et al.

(10) Patent No.: US 6,171,187 B1
(45) Date of Patent: Jan. 9, 2001

(54) INTERFACE DEVICE FOR CENTRAL PROCESSING UNIT OR NETWORK TERMINAL, KEYBOARD, PORTABLE COMPUTER AND ACCESSORY FOR GAMES CONSOLE

(76) Inventors: Jean-Pierre Audebert; Josette Riviere-Audebert, both of 20, rue Jean-Paul Sartre, F-77330 Ozoir la Ferriere (FR)

(*) Notice: Under 35 U.S.C. 154(b), the term of this patent shall be extended for 0 days.

(21) Appl. No.: 08/894,446
(22) PCT Filed: Feb. 21, 1996
(86) PCT No.: PCT/FR96/00272
   § 371 Date: Aug. 19, 1997
   § 102(e) Date: Aug. 19, 1997
(87) PCT Pub. No.: WO96/26480
   PCT Pub. Date: Aug. 29, 1996

(30) Foreign Application Priority Data

Feb. 23, 1995 (FR) .................................................. 95 02121
May 4, 1995 (FR) .................................................. 95 05343
Jun. 8, 1995 (FR) .................................................. 95 06778

(51) Int. Cl.[7] .............................. A63F 13/00; A63F 9/24; G06F 17/00; G06F 19/00
(52) U.S. Cl. ................................. 463/37; 463/36; 463/42; 463/46; 463/47; 273/148 B; 273/148 R; 345/168; 345/156
(58) Field of Search ................................... 463/36, 37, 38, 463/42, 44, 45, 46, 47; 273/148 R, 148 B; 345/168, 156

(56) References Cited

U.S. PATENT DOCUMENTS

| Re. 32,282 | * | 11/1986 | Baer ................................... 273/85 G |
| 5,317,505 | * | 5/1994 | Karabed et al. ..................... 364/410 |
| 5,611,731 | * | 3/1997 | Bouton et al. ......................... 463/37 |
| 5,621,436 | * | 4/1997 | Solhjell ................................ 345/163 |
| 5,644,113 | * | 7/1997 | Date et al. ............................ 200/5 R |
| 5,694,123 | * | 12/1997 | Selker et al. ........................... 341/22 |

FOREIGN PATENT DOCUMENTS

| 37 07 049 | 11/1988 | (DE) . |
| 0 520 090 | 12/1992 | (EP) . |
| 6-043322 | 3/1986 | (JP) . |
| 3-263118 | 11/1991 | (JP) . |
| 6-012941 | 1/1994 | (JP) . |
| WO 93/18500 | 9/1993 | (WO) . |

* cited by examiner

Primary Examiner—Valencia Martin-Wallace
Assistant Examiner—Binh-An Nguyen
(74) Attorney, Agent, or Firm—Young & Thompson (57) ABSTRACT

An interface device between a user and a CPU or a network terminal, e.g. a microcomputer keyboard or a game console accessory, includes control apparatus such as keys provided on the top surface of a housing and at least two buttons on each of the two side surfaces of the keyboard, the buttons being connected to the connections of certain keys. The keyboard may also be provided with supporting areas on both front corners and on the front edge of the top side, with a microswitch being provided beneath each of the areas and connected in parallel to any one of the keys on the keyboard.

7 Claims, 6 Drawing Sheets

FIG_1

FIG_2

FIG_3

FIG_4

FIG_12

FIG_10

FIG_9

FIG_13

FIG_11

FIG. 20

INTERFACE DEVICE FOR CENTRAL PROCESSING UNIT OR NETWORK TERMINAL, KEYBOARD, PORTABLE COMPUTER AND ACCESSORY FOR GAMES CONSOLE

BACKGROUND OF THE INVENTION

The present invention relates to an interface device for a central processing unit or a network terminal. It also relates to a computer keyboard, a portable computer and an accessory for a games console with ergonomic buttons.

DESCRIPTION OF THE RELATED ART

Several interface devices exist which are used for transmitting information from a user to a central processing unit or a network terminal. The principal interface device for a computer is the keyboard. The original computer keyboards had their overall shape and the shape and layout of their keys similar to those of typewriters.

Keyboards are also known whose ergonomics have been improved by the addition of numerical keys and of keys for the four operations grouped in the form of a separate keypad located to the right of the alphabetic keys.

Subsequently many function keys have been added to keyboards because of the growing complexity of the hardware and software present on the market. They make it possible to access either pre-programmed functions initially existing in the read only memory of the computer or functions programmed by means of software.

In order to further improve the user's comfort and the speed of typing over a long period without fatigue, keyboards with curved shapes have been considered.

The interface means present on portable computers have followed the same evolution.

The ergonomics of function and control keys present on games consoles or on their interface devices forming accessories have also been improved.

In the case of games software products, all of the keys can be used to obtain multiple luminous play effects visible on the screen. The user will apply his skill by pressing appropriate keys at the correct time and by repeating this same operation many times. During prolonged use of a conventional keyboard, this can result both in a reduction in the speed of keying and furthermore in fatigue in the muscles and tendons of the fingers, hands and wrists.

A disadvantage of interface devices of the prior art and of the corresponding keyboards is the fact that these means of control are generally located on the upper face of the interface device, the keyboard of the computer, the case of the portable computer or the games console or its accessories. Access to some of them is therefore often not very ergonomic.

EP-A-0 520 090 discloses a keyboard incorporating on one of its side faces a mouse having specific functions which do not replace keys of the keyboard.

The document "Patent Abstract of Japan", vol. 16, No. 70 (P-1315) discloses a mouse provided with ten digital keys enabling a user to directly enter a digital input through this mouse instead of through the keyboard of the computer.

The document "Patent Abstract of Japan", vol. 10, No. 202 (P-477) discloses a combination of a conventional keyboard and of a pedal-type keyboard the keys of which are connected in parallel with function-keys of the conventional keyboard.

SUMMARY OF THE INVENTION

The purpose of the invention is to propose an interface device for a central processing unit or a network terminal which provides additional means of control with a different arrangement, especially adapted to the positions of the user's hands.

According to the invention, the interface device between a user and a central processing unit or a network terminal comprising a casing comprising first means of controlling said central processing unit accessible on the upper face of the said casing, and second means of controlling said central processing unit or network terminal, said second means of control being disposed on at least one of the lateral faces of said casing, is characterized in that said second means of control are connected within said casing to means of control among the said first means of control.

The invention is based on the observation that, in many cases, it is difficult to access certain keys without having to move the forearm, to extend one or more fingers excessively and to contort the hand. This generally happens when the user wishes to use the most distant keys located at the right and left extremities with respect to the orientation of the marking of signs on the keys.

Because of the tendency towards the profusion of the number of keys on the upper face, the lateral disposition of the new controls is particularly astute.

Preferably, the lateral disposition and the position along the lateral face also makes it possible for the user to touch the other accessible keys with the palm of the hand or with the fingers which remain free.

Different types, shapes and sizes of control means, particularly in the form of buttons, can be used. The button or buttons added to the lateral faces of the keyboard according to the invention will either be physically connected, in particular to the key connections, or connected directly to the microprocessor controlling the interface device.

According to a first aspect of the invention, a computer keyboard comprising a support casing, an assembly of keys, particularly alphanumeric keys, typographic keys and function keys, is characterized by similar control means in the form of buttons placed on its lateral faces.

According to second aspect of the invention, a portable computer casing will comprise the same types of control means on its lateral faces.

According to the third aspect of the invention, a games console will comprise an accessory having identical control means placed on its lateral faces.

The use of these additional buttons will, in particular, make it possible to obtain the same result as using the known keys and will therefore be ergonomically well adapted to certain video games.

Advantageously, it is also possible to provide an interface device according to the invention furthermore comprising, at the two front corners of the upper face of the said casing, at least two pressure zones, left and right respectively, and, inside the said casing under each pressure zone, means of detecting pressure applied on the said pressure zone, and arrangements are made to generate, in response to the detection of pressure, a control, particularly a jolt control to be sent to the central processing unit.

In a preferred embodiment of such an interface device according to the invention, the latter furthermore comprises at least one frontal pressure zone and, within this casing under this frontal pressure zone, means of detecting pressure applied on the said frontal pressure zone, and arrangements are made to generate, in response to the detection of pressure on this frontal pressure zone, a frontal jolt control to be sent to the central processing unit. In a particular embodiment, there are provided two frontal pressure zones located in the proximity of the left and right pressure zones respectively.

Return means are preferably provided in order to apply a return force substantially opposing the pressure forces applied by a user. They can for example comprise return springs. The upper face of the casing generally has at least two elastically deformable pressure zones.

In a particular embodiment, the means of detection comprise switch means, for example microswitches, or any other contact, connected in parallel to the two connectors of a predetermined key located on the upper face of the casing in such a way that a detection of pressure on a pressure zone by the corresponding detection means is equivalent to the pressing down of the predetermined key.

By an arrangement of the user's hands on either side of the keyboard or console accessory, the on-screen game of pinball will, thanks to the invention, be as pleasant to play as a pinball table game.

BRIEF DESCRIPTION OF THE DRAWINGS

Other features and advantages of the invention will furthermore emerge from the following description relating to a non-limitative example.

In the appended drawings.

DESCRIPTION OF THE PREFERRED EMBODIMENTS

Figure 1:
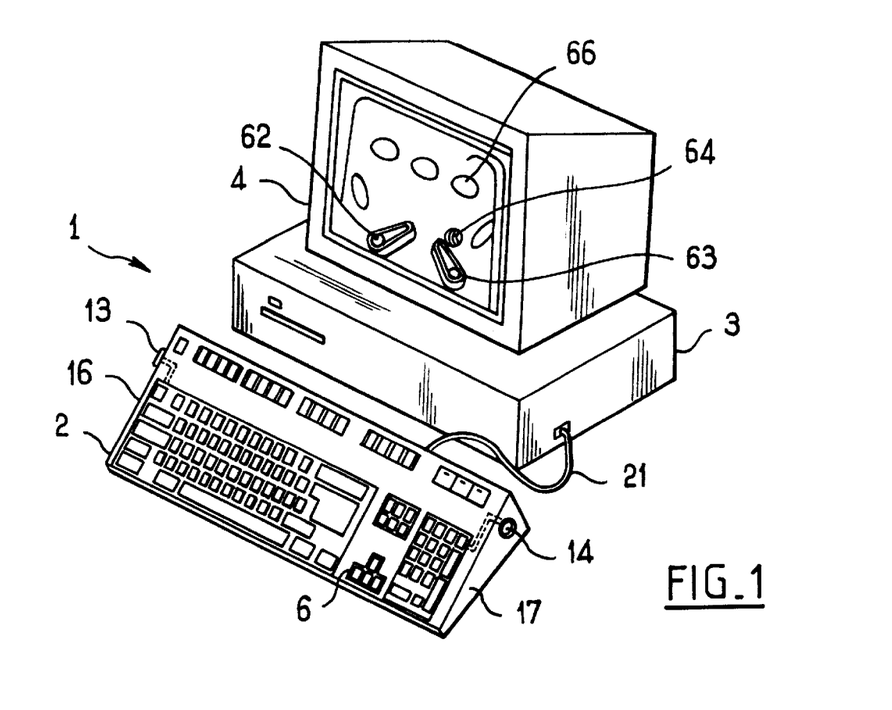
FIG. 1 is an overall view of an assembly of a computer keyboard according to the invention, a central processing unit and a video screen.

In the example shown in the figures, the computer 1 comprises, in particular, a keyboard 2, a central processing unit 3 generally equipped with several storage units, in particular a floppy disk drive, a hard disk drive or a CD-ROM drive, and a video screen 4.

In the case of the network terminal, it is possible, for example, to consider the combination of just a screen, a keyboard according o the invention and a network connection unit, this combination possibly being able to be completed by a CD-ROM drive.

Figure 2:
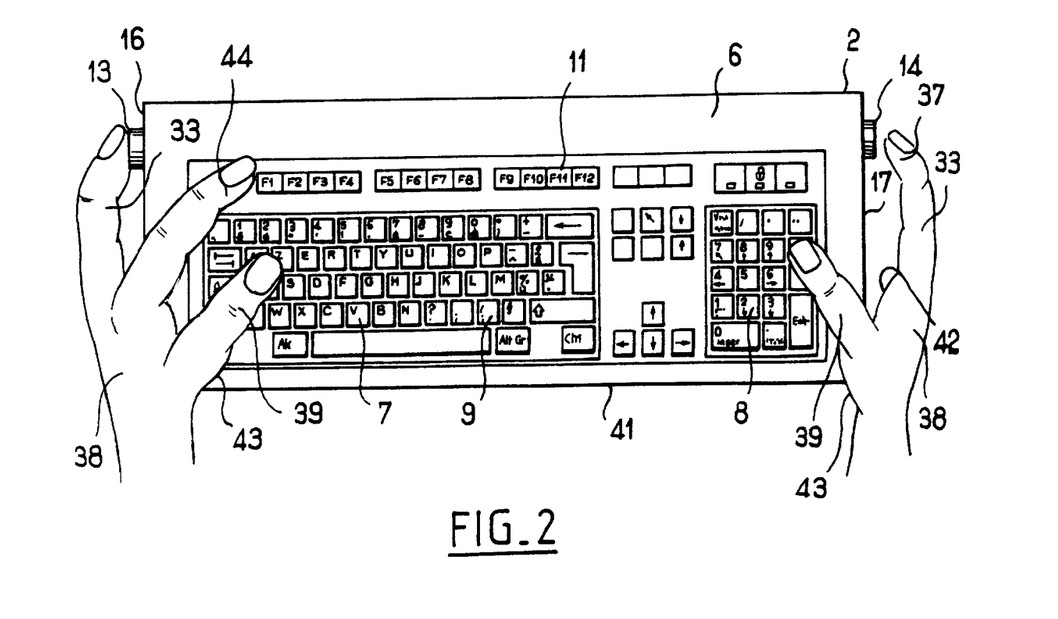
FIG. 2 is a top view of the computer keyboard according to the invention, seen with the two hands of a user.

The keyboard 2 consists of a support casing 6 on the upper face 12 of which an assembly of keys is regularly disposed. Non-exhaustively, the keys are alphabetic keys 7, numerical keys 8, typographic keys 9 for obtaining punctuation signs and the most common symbols, and function keys 11 making it possible to access controls as diverse as upper case letters, movement of the curser on the screen, deletion of characters, tabulation, saving, . . . etc together with various tasks which software will be able to allocate to certain specific keys bearing the markings F1, F2, up to F12.

According to the invention, the computer keyboard 2 comprises two additional buttons 13 and 14 each ergonomically disposed on the two lateral faces 16, 17 of the keyboard 2.

These two buttons 13, 14 are respectively connected to any key 7, 8, 9, 11 of the keyboard 2. The keys generally used for this connection are the keys allowing selection of upper case characters. Keys also used are those located respectively furthest to the right and to the left of the keyboard, that is to say those physically closest to the added buttons. The other two keys which can also be used are the function keys 11, F11, and F12. In many software packages, they are not normally allocated to any particular control.

A keyboard 2 has a wiring system produced in the form of a matrix 18 having as many column wires 71 as there are columns of keys and as many line wires 72 as there are rows of keys. For greater clarity, only a small number of column wires and line wires have been shown in FIGS. 3 and 4. Pushing in a key 24 makes an electrical connection at the point of intersection between the line and the column corresponding to this key 24, this connection being detected by a dedicated microprocessor 32 which then transmits a code called a scanning code via the serial interface cable 21 to the specific bus 19 of the central processing unit 3.

Figure 3:
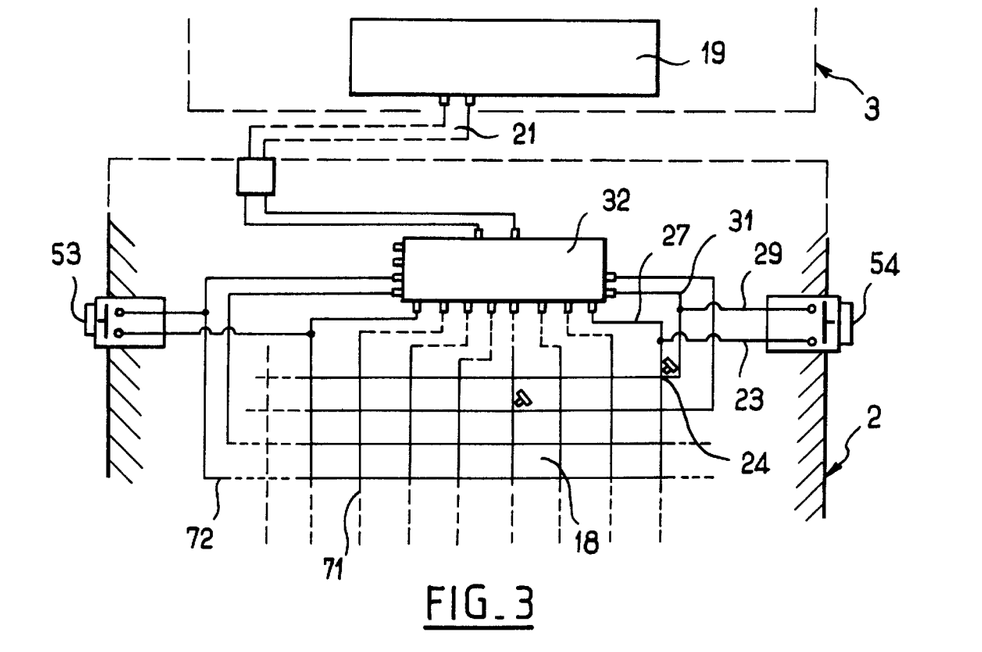
FIG. 3 a simplified electrical diagram of a part of the computer keyboard according to the invention showing the connections of the buttons.

Each additional button 53, 54 is connected in parallel to a predetermined key. The cable 23 leaving from one of the connectors of button 54 is connected to the column cable 27 of key 24 and the other connector of button 54 is connected by the cable 29 to the cable of line 31 of key 24. The two cables 27, 31 specific to key 24 are connected to the microprocessor 32 which is connected to the central processing unit 3. Pressing the button 54 will have the same effect as pressing the key 24 to which it is connected.

Figure 4:
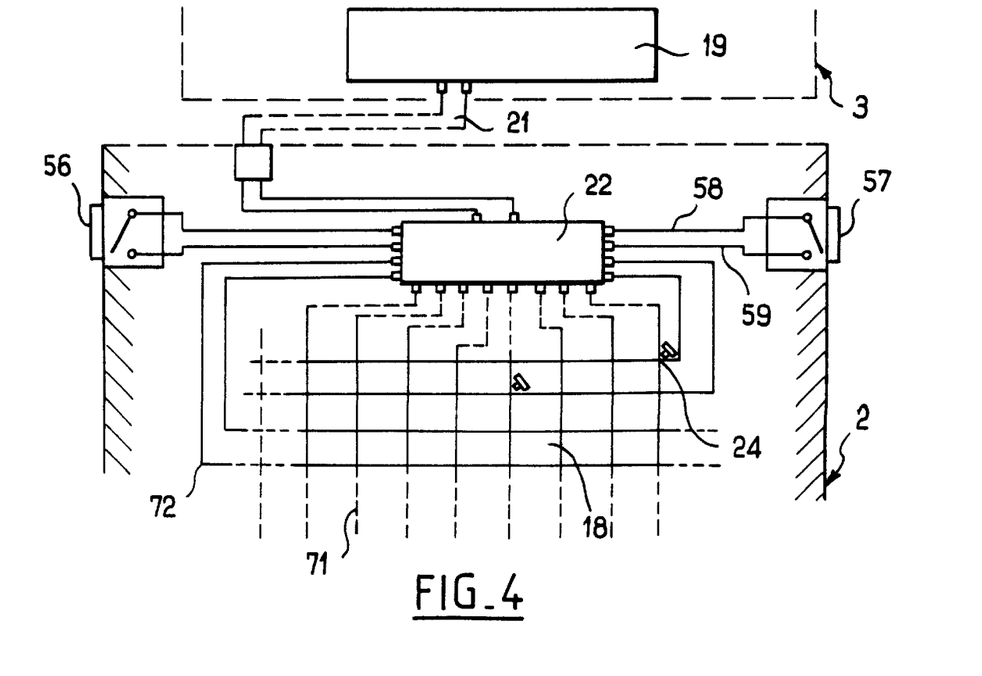
FIG. 4 is a simplified electrical diagram of a part of the computer keyboard showing another method of connecting the buttons according to the invention.

For example, it is possible to arrange that the buttons 56, 57 are directly connected by cables 58, 59 to the integrated circuit 22 without passing through a key. This makes it possible, by internal programming or by software, for the additional button or buttons to have a specific scanning encoding recognised by the central processing unit 3 without using a code already allocated to a key. This therefore results in obtaining new keys having a new function. This assumes the production of a specific microprocessor 22 able to receive these new connections.

The buttons 13, 14 are fixed or built into the substantially vertical lateral faces, 16, 17 of the casing 6 of the keyboard 2. In this case they are pressure switches of the bell-push type having one or more return springs. These buttons only remain on if a continuous pressure is applied.

They are of minimum size so that they can be actuated by the end of the operator's finger or of several of the operator's fingers 33 hitting these buttons.

Figure 5:
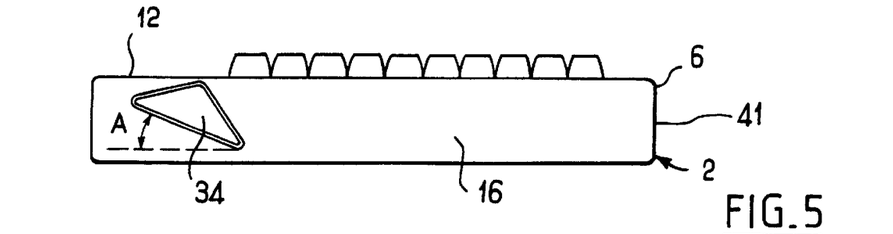
FIG. 5 is a side view of an embodiment of the computer keyboard according to the invention.
Figure 6:
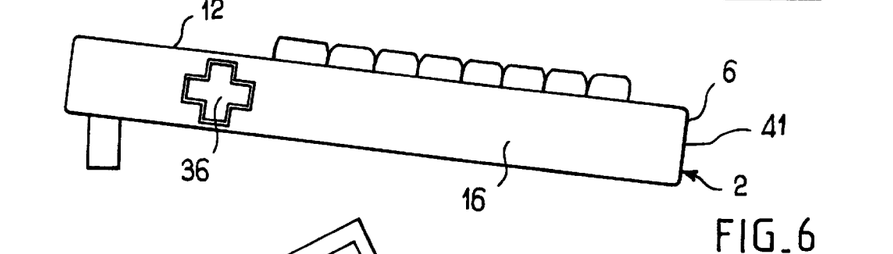
FIG. 6 is a side view of a another embodiment of the computer keyboard according to the invention.

They can be any shape, round in particular. However, in the case of a button of elongated shape 34, it can form an angle of inclination A defined with respect to the upper surface 12 of the keyboard. The angle A will be chosen in such a way as to respond to ergonomic criteria corresponding to the position of the last phalange 37 of the first finger, the second finger or the third finger and the auricle of a hand 38 placed vertically and parallel with the lateral edge, the palm 42 facing the lateral edge 17. The cruciform button 36 provides four possible control positions for the same switch.

The button 13, 14, is disposed on the lateral face at a distance defined with respect to the front or the rear edge, determined by the natural position of a user's hand 38. The button 13, 14, is placed such that when the first finger and/or the second finger and/or the third finger and/or the auricle 33 is placed on the button, the thumb 39 can reach one or more other keys of the keyboard. In the case of a different operating position, either the palm 42 or more precisely the ball of the thumb 43 of the palm of the hand or one or more fingers remaining free 44 can press the keys of the upper face, at the extreme right or at the extreme left of the keyboard, whilst allowing use of the button with one or more fingers 33. The button is, in particular, positioned in the region of the upper third most distant from the front edge 41 of the keyboard 2.

Figure 7:
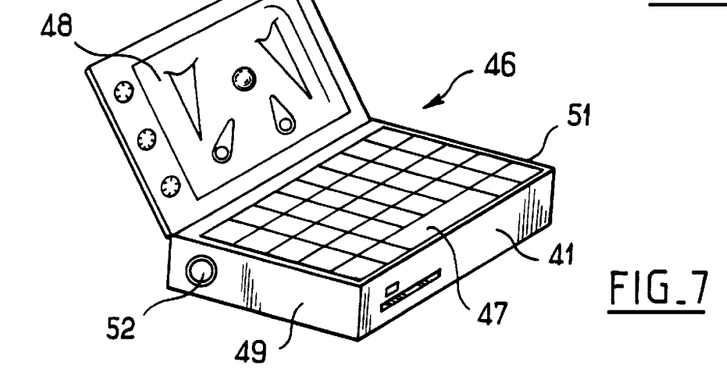
FIG. 7 is a perspective view of a portable computer according to the invention.

By an entirely equivalent design, a portable computer 46 with a flat display screen 48 and a keyboard 47 comprises, on one or on both of the lateral faces 49, 51, one or more additional buttons 52. Their connection, their shape and their disposition are produced in an entirely identical manner to that described above for the separate computer keyboard 2.

Figure 8:
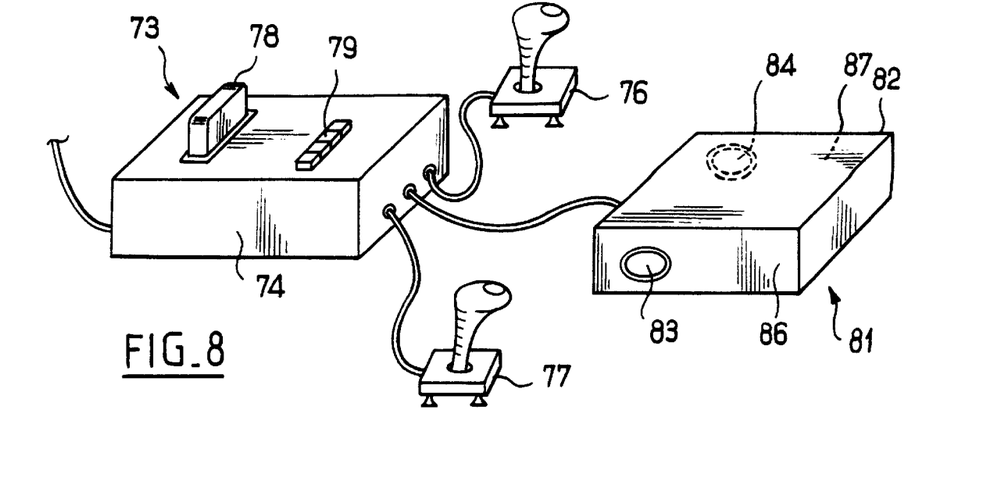
FIG. 8 is a overall view of a games console comprising an accessory or a keyboard according to the invention.

In a similar way, a video games console 73 comprises a central processing unit casing 74 and interface means of the joystick type 76, 77, connected to this casing 74. Games software in the form of a cartridge 78 are read by the central processing unit 74 and keys 79 allow various functions such as starting and choice of playing difficulty.

An interface device forming an accessory 81 having for example the shape of a parallelepipedic casing 82, is connected to the central processing unit 74 of the console.

According to the invention, this accessory possibly comprises, in addition to its keys, means of control in the form of two buttons 83, 84 each disposed on the lateral faces, 86, and 87 respectively, of the casing 82.

The connection of the buttons to a dedicated microprocessor in the accessory 87 or in the console 74 or in parallel with keys 79 or if necessary with keys of the accessory 81, their shape and disposition are produced in a way which is entirely identical to that which has been described above for the separate computer keyboard.

It will be possible to provide an accessory of the same type connecting to the serial port of the computer or of the portable computer.

In the simplest case, this addition of two keys, one on each of the faces of the keyboard 2, of the portable computer 46 or of the accessory 81 of the games console, makes the use of any type of software more pleasant due to easier operation. By hitting one of these buttons, there will be obtained, depending on the type of wiring used, either the same effect as with a conventional key or a different effect. In both cases, the button will not have any effect on the normal functioning of the keyboard. Used in particular with games software, these two buttons will be able to control the movement on the screen of images or figurines in order to obtain games effects. The user of the games console 73 will take the accessory 81 on his knees, or will place it on a table.

These buttons have a specific use in the case of software for the pinball game 66 where the two buttons are truly adapted for the use of two flippers 62, 63 intended to return the ball 64 in conditions approaching reality. The player using the keyboard or the accessory has exactly the same position of the hands 38 and wrists as a player on a pinball table, with the same ability to jolt the keyboard and to press other buttons with the palm 42 of the hand in order to obtain other visual and audible effects. For certain existing software products, the user will have to choose the two keys physically connected to the two buttons as the keys allocated to the flippers. The tilt with stop of play function will naturally be possible by repeatedly pressing with the palm at high frequency.

Figure 9:
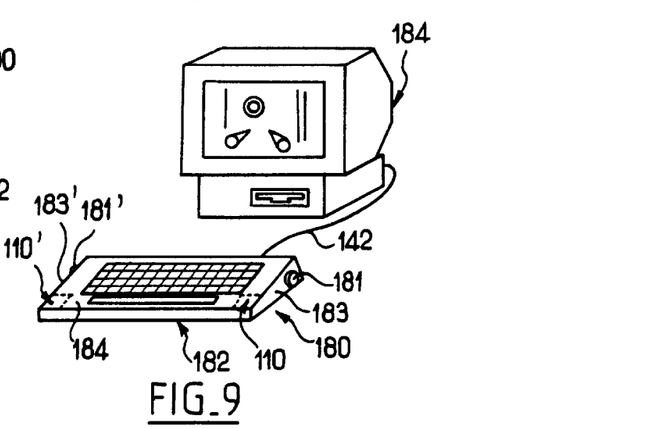
FIG. 9 shows an example of a keyboard according to the invention, furthermore comprising pressure zones.

It is also possible to design, with reference to FIG. 9, a keyboard 180 according to the invention connected to a central processing unit 184 and comprising, at each corner of the upper face 184 of its casing 182, two pressure zones 110, 110' and on each of its lateral faces 183, 183', a control button 181, 181'.

An interface device is thus obtained which makes it possible to reproduce, in a particularly realistic manner, all of the sensations experienced by a pinball table player. In effect, each lateral button is allocated to the control of a right or left flipper within the game software.

Figure 12:
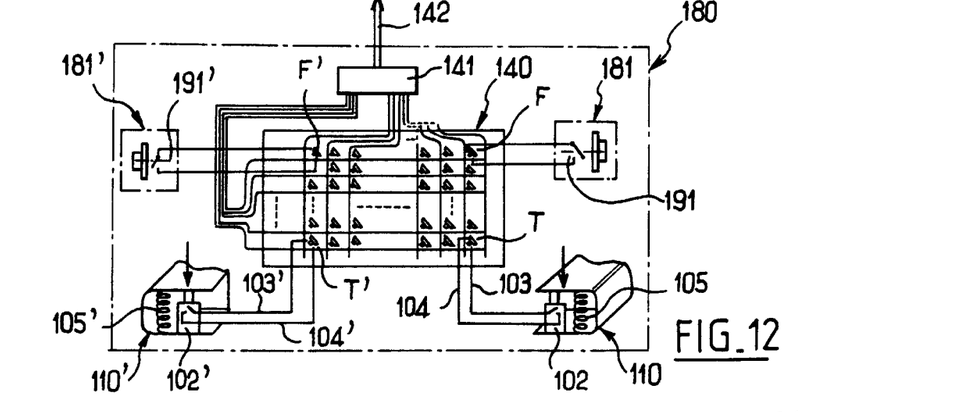
FIG. 12 is a simplified diagrammatic view of an example of electrical connections within a keyboard according to the invention such as shown in FIG. 1.
Figure 14:
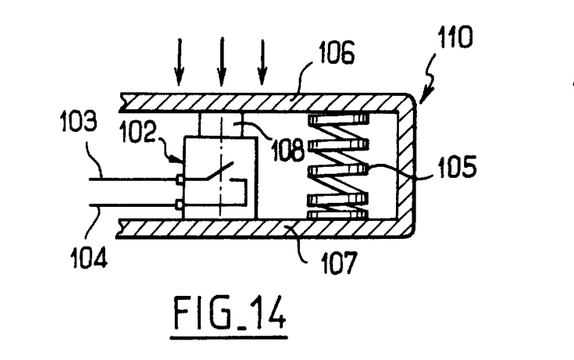
FIG. 14 is cross-sectional view of one of the corners of a keyboard according to the invention.
Figure 15:
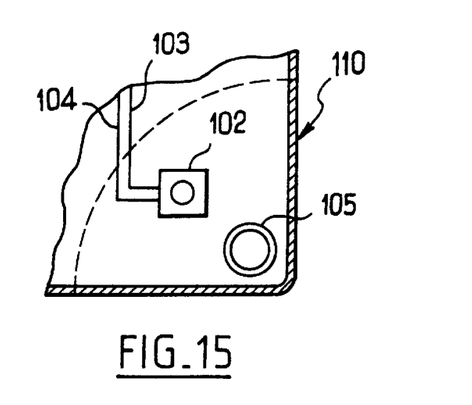
FIG. 15 is an exploded top view of the corner shown in FIG. 14.
Figure 16:
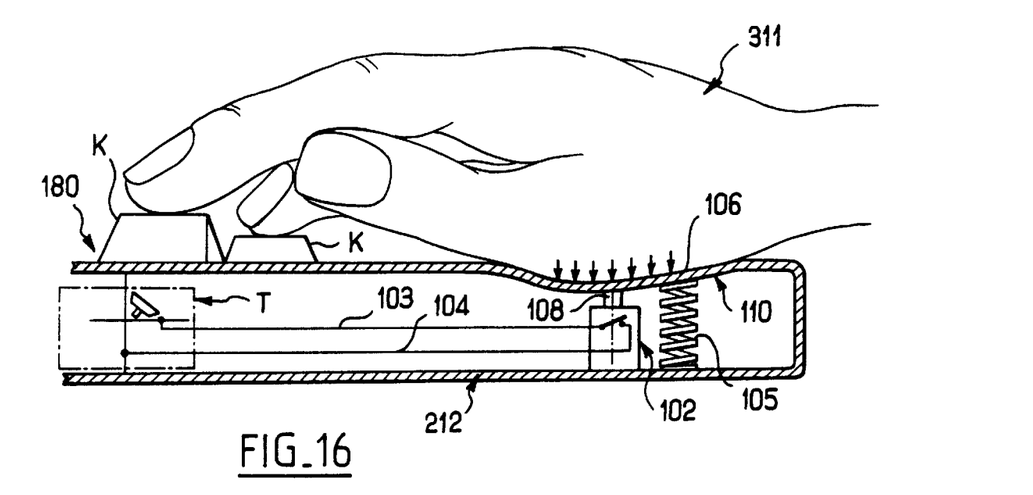
FIG. 16 is a partial cross-sectional view of a keyboard according to the invention provided with pressure zones in use.

Under each pressure zone 110, 110', the keyboard 180 comprises, as shown in FIG. 12, 14 and 16, a microswitch 102, 102' comprising a moving part 108 disposed against the inside surface of the upper face so that, when a significant pressure is applied to the pressure zone 110, the effect of this is to displace the moving part 108 and to cause the closing of the microswitch 102 and therefore a contact between the two conductors 103, 104 connected to the connectors of this microswitch. A spring 105 disposed close to the microswitch 102 ensures the return of the upper face 106 into a substantially flat position of equilibrium. The other pressure zone can of course have an identical internal structure to that which has just been described. Each microswitch 102, 102' is connected via a pair of conductors 103, 104; 103', 104' to a predetermined key T, T' of the matrix of keys 140 of the keyboard 180, with reference to FIG. 12, and is associated with a return spring 105, 105'. It is possible, for example, to provide connections directly at the level of the keys, or to provide connections at the level of a control circuit 141 of the keyboard 180, this control circuit usually being connected by a serial interface 142 to the central processing unit.

Figure 11:
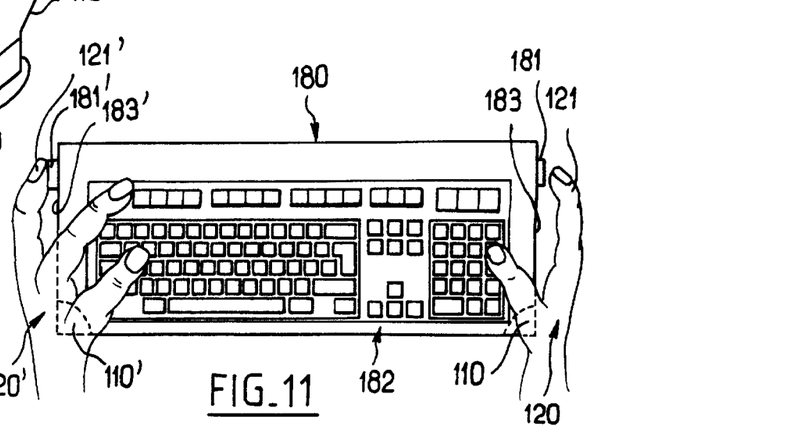
FIG. 11 shows the position of the hands of a user of a keyboard such as shown in FIG. 9.

Each control button 181, 181' controls a switch 191, 191' connected to any key F, F' from among all of the keys 140 of the keyboard 180. Pressing a control button 181, 181' is thus equivalent to pressing in the key F, F' with which it is associated. It thus suffices to allocate a flipper control function to each connected key by means of software parameterization. The player using the keyboard 180 can then actuate the two flippers by pressing the control buttons 181, 181' with his fingers 121, 121' and can command jolts to the pinball, either to the right or to the left, or frontally, by applying pressure on one and/or the other of the pressure zones 110, 110', either with the right hand, or with the left hand, or with both hands simultaneously, as shown in FIG. 11.

The user of pinball game software using the keyboard 180 according to the invention can, whilst pressing the keys K, also press the pressure zone 110 with the palm of his hand 311 as shown in FIG. 16. If he applies a significant pressure on this pressure zone, thus expressing a desire to impart a jolt to the pinball, it then causes the closure of the microswitch 102, which is equivalent to pressing the key T to which this microswitch 102 is connected. It is assumed that this key T has previously been designated, for example when initializing the game, as the key corresponding to a right or left jolt command depending on whether the right or left pressure zone is the one in question. The return spring 105 ensures the return of the pressure zone 110 to the substantially flat position when the player is no longer applying pressure to the latter. It should be noted that the microswitch 102 can be connected in parallel to any key of the keyboard, since pinball game software products offer a parameterization of the various control keys.

Figure 10:
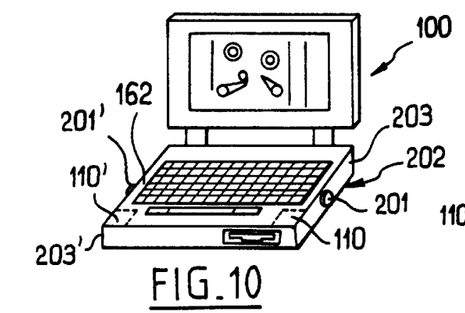
FIG. 10 shows an example of a portable computer, including pressure zones.
Figure 13:
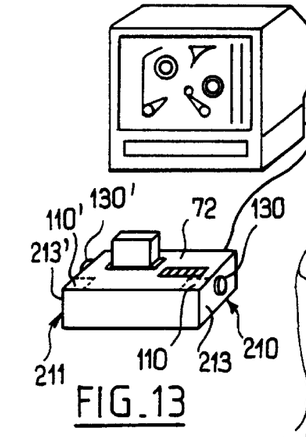
FIG. 13 shows an example of a games console according to the invention, including pressure zones.

This other embodiment of the invention can also be implemented for a portable computer 100 whose main casing 202 is provided, on the one hand, with two pressure zones 110, 110' disposed in the two front corners of its upper face 162 and, on the other hand, with two control buttons 201, 201' disposed on its two lateral faces 203, 203', with reference to FIG. 10. It is also possible to design, within the scope of the present invention, a games console 210 connected to a television set 112 and comprising, on the one hand, on the upper face 172 of its case 211, two pressure zones 110, 110' and, on the other hand, two control buttons 130, 130' on the lateral faces 213, 213', with reference to FIG. 13, of the said case.

Figure 17:
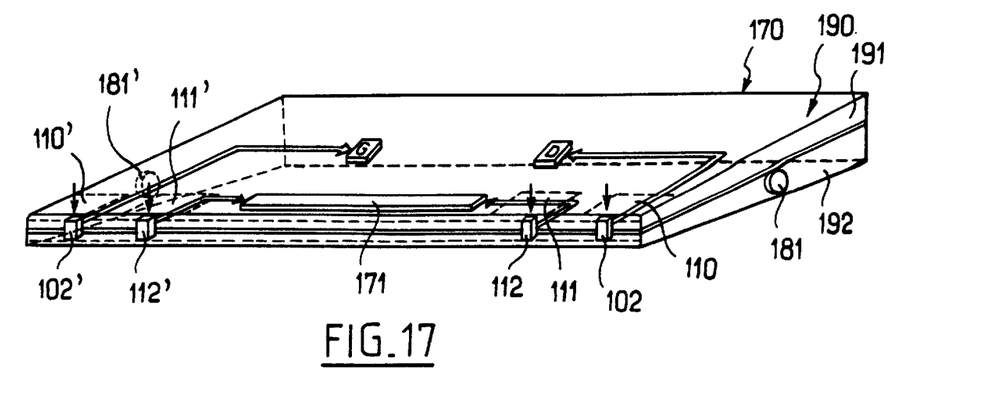
FIG. 17 shows an example of a keyboard according to the invention comprising four pressure zones.

Advantageously, it is possible to design a keyboard according to the invention, comprising four pressure zones, as shown in FIG. 17. The keyboard 170 thus comprises, in addition to two lateral buttons 181, 181', a left pressure zone 110', a right pressure zone 110 and two frontal pressure zones 111', 111 disposed for example close to the left and right pressure zones 110', 110 respectively. With each pressure zone 110', 111', 111, 110 there is associated a switch 102', 112', 112, 102 disposed, inside the casing 190 of the keyboard 170, between the two parts, upper 191 and lower 192 respectively, of this case 190. It is furthermore possible to provide return means such as springs and means of adjusting these return means, for example one or more screws accessible under the keyboard. Furthermore, the keyboard according to the invention can furthermore comprise means of locking the upper and lower parts of the keyboard in such a way that the switches of the pressure zones then become inoperative. These locking means can be particularly appreciated in order to avoid any unwanted control due to a pronounced pressing on the keyboard when the latter is being used in an ordinary manner.

The switches, 102, 102', 112, 102, which can be of any technology, are each connected to predetermined keys of the keyboard. Thus, by way of non-limitative example, in the example shown in FIG. 17, the left 102' and right 102 switches respectively are connected in parallel to the keys "G" and "D" respectively of the keyboard 170, whilst the left and right frontal switches 112', 112 respectively are both connected in parallel to the space bar 171 of the keyboard 170.

Figure 18:
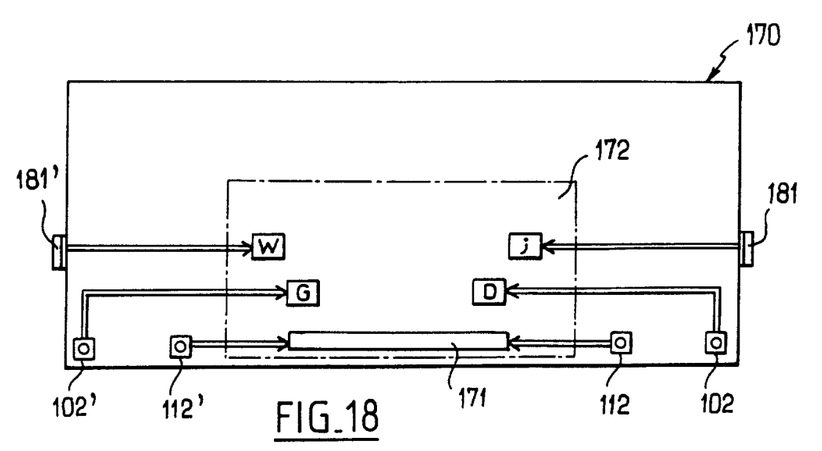
FIG. 18 shows a particular method of connecting switches inside the keyboard according to the invention as shown in FIG. 17.

In a particular embodiment of a keyboard 170 such as shown in FIGS. 17 and 18, the lateral buttons 181' 181 are arbitrarily connected to the keys "W" and ";" respectively of the set of keys 172 equipping this keyboard, whilst the switches of the left and right pressure zones 102', 102 are connected to the keys "G" and "D" and the switches of the frontal pressure zones 112', 112 are connected to the space bar 171.

Figure 19:
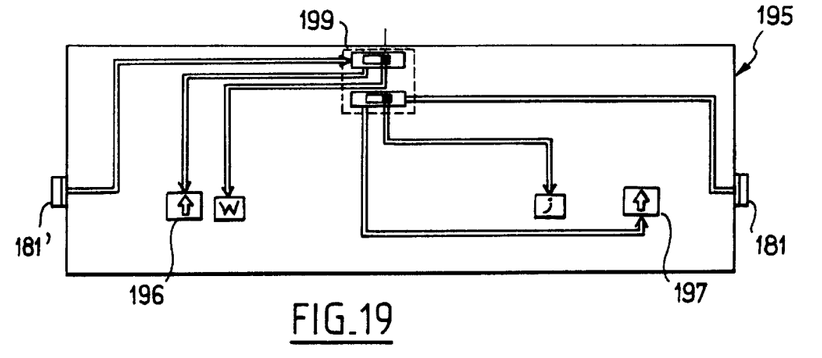
FIG. 19 shows another particular method of connecting switches inside a keyboard according to the invention furthermore provided with a double change-over selection switch.

It is also possible to design a keyboard 195 according to the invention provided with double changeover switch 199 making it possible to modify the allocation of side buttons 181', 181 according to the type of flipper software used. In effect, for certain software products used with the DOS operating system, the left and right flipper functions respectively are imperatively associated with the upper case keys 196, 197 on either side of the keyboard, whilst for recent software products used with the Windows 95 operating system, these flipper functions are respectively associated with the keys "W" and ";" or with any other key programmable by software. This double changeover switch 119 can for example be located on the rear face of the keyboard 195.

Figure 20:
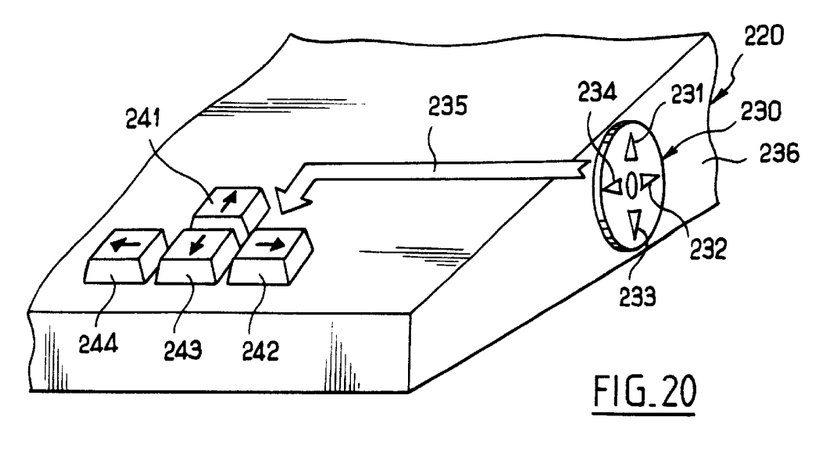
FIG. 20 shows the use of a button of the cruciform type in a keyboard according to the invention.

Within the scope of the present invention, it is also possible to design a keyboard 220 comprising, on at least one of its lateral faces 236, a device 230 of the cruciform type combining four switches each associated with a direction arrow 231, 232, 233, 234: up, right, down, left, with reference to FIG. 20. Each switch is connected in parallel to the corresponding key 241, 242, 243, 244 present on the keyboard, by additional tracks 235 produced on the connection plane of the keyboard.

In order to implement the invention, it will be possible either to adapt existing keyboards by wiring the additional buttons in parallel with existing keys, or to produce a specific keyboard integrating these additional buttons. Such a keyboard will then have to be provided with a microprocessor or specific micro-controller to ensure the decoding of these additional buttons.

An advantageous technique for producing the keyboard according to the invention consists in designing a specific flexible printed circuit by adapting the flexible printed circuit of a conventional keyboard by adding connection tracks and contact modules disposed, on the one hand, at each lateral end of this printed circuit for the flipper keys and, on the other hand, on the front section of this flexible printed circuit for the detectors of the pressure zones.

The present invention can also be implemented for videotext terminals, in particular a Minitel. It is thus possible to provide a videotext terminal with two buttons respectively disposed on the two lateral faces of its keyboard. It can furthermore be applied to keyboards connected to a central processing unit or to a terminal by non-wire connections, for example infra-red or radiofrequency connections. Keyboards according to the invention can also be implemented for network terminals, particularly those known as "Network Computers" (NC) which can be installed, for example in housings, businesses, hotel rooms, public places, schools and shops.

The invention is not of course limited to the described and shown examples. The number of buttons on the lateral face or faces will be variable. In the specific case of pinball, it is possible for example to provide, in addition to the two buttons allocated to the two flipper control functions, two additional control devices allocated to the control of pinball movement effects.

It will be possible for the type of button used to be different depending on the function desired to be allocated to them, for example slide switches, rotary knobs or touch-sensitive keys, without limitation of technology. It will be possible for the shape of these buttons to change according to fashion or to technical developments. Furthermore, it is possible to provide, still within the scope of the present invention, buttons that are phosphorescent or even provided with lighting means.

What is claimed is:

1. An interface device between a user and a central processing unit or a network terminal, comprising:
   a casing including a first means of controlling said central processing unit accessible on the upper face of said casing,
   a second means of controlling said central processing unit or network terminal disposed on at least one of the lateral faces of said casing,
   said second means of control being connected in parallel with a predetermined means of control among said first means of control,
   at two front corners of an upper face of said casing, two pressure zones,
   inside said casing under each said pressure zone, means of detecting pressure applied on said pressure zone, and,
   arrangements to generate, in response to detection of a pressure, a control, a particularly a jolt control to be sent to the central processing unit.

2. An interface device according to claim 1, characterized in that it furthermore comprises at least one frontal pressure zone and, within said casing under said frontal pressure zone, means of detecting pressure applied on said frontal pressure zone, and in that arrangements are made to generate, in response to detection of a pressure on said frontal pressure zone, a frontal jolt control to be sent to the central processing unit.

3. An interface device (180) according claim 1, characterized in that it furthermore comprises, within said casing (212) under each pressure zone (110, 110'), return means (105) in order to apply a return force substantially opposing pressing forces applied by a user.

4. An interface device (180) according to claim 3, characterized in that it furthermore comprises means for adjusting a detection threshold of the pressure detection means.

5. An interface device (180) according to claim 1, characterized in that the upper face of the casing has at least two elastically deformable pressure zones.

6. An interface device (180) according to claim 1, characterized in that for each pressure zone (110, 110'), the means of detection comprise switch means (102, 102') connected in parallel to two connectors of a predetermined key (T, T') located on the upper face (106) of the casing (212) in such a way that detection of a pressure on a pressure zone (110, 110') by the corresponding detection means (102, 102') is equivalent to a pressing down of the predetermined key (T, T').

7. An interface device (1) according to claim 6, characterized in that the switch means comprise, under each pressure zone (110, 110'), at least one microswitch (102, 102').

\* \* \* \* \*